United States Patent
Barnes et al.

(10) Patent No.: US 11,760,027 B2
(45) Date of Patent: Sep. 19, 2023

(54) TEMPERATURE CONTROL IN ADDITIVE MANUFACTURING SYSTEMS

(71) Applicant: HEWLETT-PACKARD DEVELOPMENT COMPANY, L.P., Spring, TX (US)

(72) Inventors: Arthur H. Barnes, Vancouver, WA (US); Vanessa Verzwyvelt, Vancouver, WA (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 92 days.

(21) Appl. No.: 16/607,751

(22) PCT Filed: Jul. 31, 2018

(86) PCT No.: PCT/US2018/044692
§ 371 (c)(1),
(2) Date: Oct. 24, 2019

(87) PCT Pub. No.: WO2020/027820
PCT Pub. Date: Feb. 6, 2020

(65) Prior Publication Data
US 2021/0362429 A1    Nov. 25, 2021

(51) Int. Cl.
*B29C 67/00* (2017.01)
*B29C 64/393* (2017.01)
(Continued)

(52) U.S. Cl.
CPC .......... *B29C 64/393* (2017.08); *B29C 64/165* (2017.08); *B29C 64/295* (2017.08);
(Continued)

(58) Field of Classification Search
CPC ... B29C 64/393; B29C 64/295; B29C 64/165; B33Y 10/00; B33Y 30/00; B33Y 50/02
See application file for complete search history.

(56) References Cited

U.S. PATENT DOCUMENTS

| | | |
|---|---|---|
| 2007/0241482 A1 | 10/2007 | Giller |
| 2017/0102689 A1 | 4/2017 | Khajepour et al. |
| 2017/0182562 A1 | 6/2017 | Das et al. |

FOREIGN PATENT DOCUMENTS

| | | |
|---|---|---|
| CN | 105916665 A | 8/2016 |
| CN | 106794605 A | 5/2017 |

(Continued)

*Primary Examiner* — Ryan M Ochylski
(74) *Attorney, Agent, or Firm* — Shook, Hardy & Bacon L.L.P.

(57) ABSTRACT

In some examples, an additive manufacturing system includes a dispensing device, an applicator, a thermal energy source, a thermal imaging device, and a controller. The controller is to cause the dispensing device to deposit a layer of build material and cause the applicator to apply the fusing agent to form an object portion and to apply the detailing agent to form a reference portion in the layer of build material. The controller is to cause the thermal energy source to heat the reference portion and to heat and fuse the object portion and cause the thermal imaging device to measure a temperature of the reference portion. The controller is to regulate a power level of the thermal energy source based on a comparison between the temperature of the reference portion and a set-point for the reference portion, which is based on a target temperature for the object portion.

10 Claims, 7 Drawing Sheets

(51) Int. Cl.
*B33Y 10/00* (2015.01)
*B33Y 30/00* (2015.01)
*B33Y 50/02* (2015.01)
*B29C 64/295* (2017.01)
*B29C 64/165* (2017.01)

(52) U.S. Cl.
CPC ............... *B33Y 10/00* (2014.12); *B33Y 30/00* (2014.12); *B33Y 50/02* (2014.12)

(56) References Cited

FOREIGN PATENT DOCUMENTS

| WO | WO-2015108546 A2 | 7/2015 |
| WO | WO2016050319 A1 | 4/2016 |
| WO | WO2016063198 A1 | 4/2016 |
| WO | WO2016119889 A1 | 8/2016 |
| WO | WO2017054842 A1 | 4/2017 |
| WO | WO-2017194122 A1 | 11/2017 |
| WO | WO2017196345 A1 | 11/2017 |
| WO | WO2017196350 A1 | 11/2017 |
| WO | WO2018017116 A1 | 1/2018 |
| WO | WO-2018080456 A1 | 5/2018 |

TEMPERATURE CONTROL IN ADDITIVE MANUFACTURING SYSTEMS

CROSS-REFERENCE TO RELATED APPLICATIONS

The present application relates to Patent Cooperation Treaty Patent Application No. PCT/US2017/055105, which was filed Oct. 4, 2017, is titled "ADDITIVE MANUFACTURING," and is hereby incorporated herein by reference in its entirety. The present application relates Patent Cooperation Treaty Patent Application No. PCT/US2018/037962, which was filed Jun. 17, 2018, is titled "ADDITIVE MANUFACTURING" and is hereby incorporated herein by reference in its entirety.

BACKGROUND

A three-dimensional (3D) printer, which may also be called an additive manufacturing process, may include a receiving platform, a dispensing device (to distribute a build material onto the receiving platform), a liquid applicator (e.g., a print head), a thermal imaging device, and a heater. The heater is to soften, melt, or fuse portions of the build material. In some cases, softening, melting, or fusing is performed with the aid of a fusing agent. In some cases, a detailing or cooling agent is used to control temperature. Any of these agents may be sprayed or printed on the build material by the liquid applicator.

BRIEF DESCRIPTION OF THE DRAWINGS

Various examples are described below referring to the following figures.

DETAILED DESCRIPTION

Figure 1:
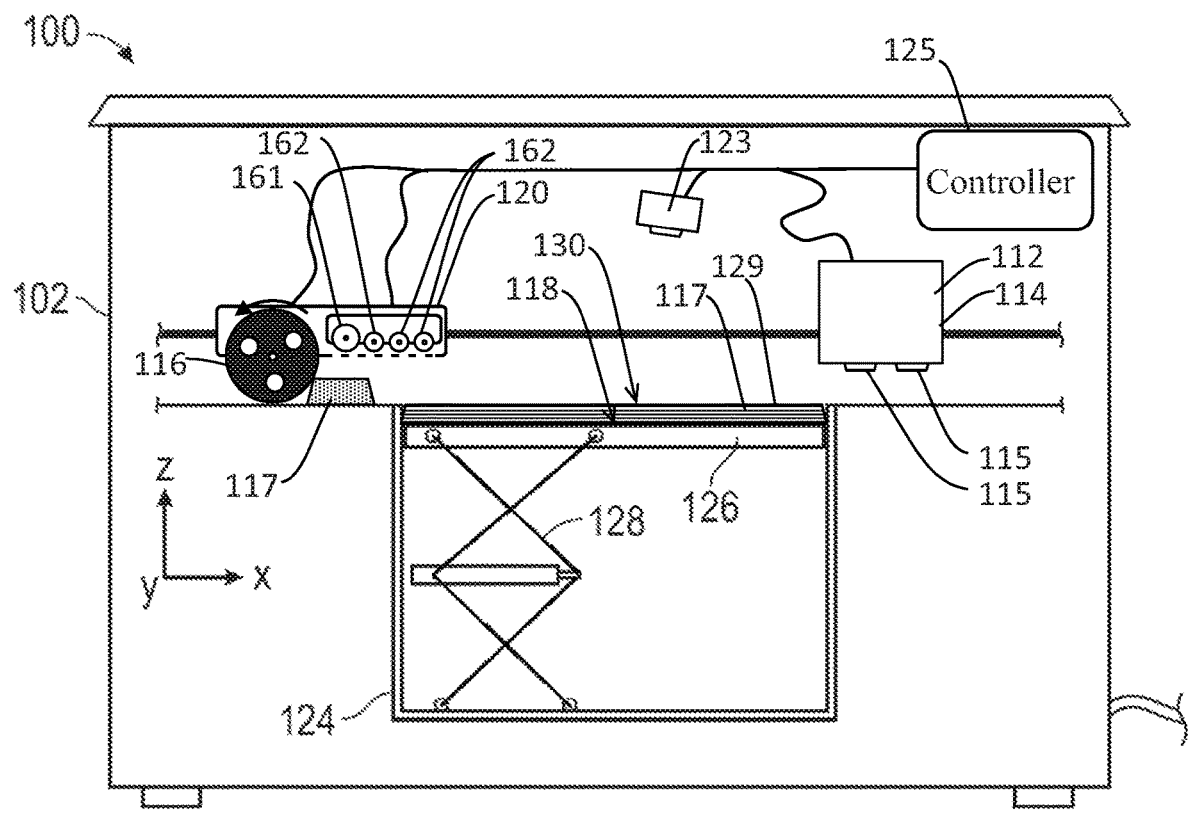
FIG. 1 shows a front view of a 3D printer that includes a controller that is to operate in accordance with various examples.

In the figures, certain features and components disclosed herein may be shown exaggerated in scale or in somewhat schematic form, and some details of certain elements may not be shown in the interest of clarity and conciseness. In some of the figures, for clarity and conciseness, a component or an aspect of a component may be omitted or may not have reference numerals identifying the features or components.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B." The terms "heating" and "applying thermal energy" are intended to be synonymous.

In various examples, an additive manufacturing process or 3D printer includes, or receives, a receiving platform having a build surface, a dispensing device to distribute a build material on the build surface, and a radiant heater to soften, melt, or fuse portions of the build material, which is aided, in some examples, by application of a fusing agent. The build material may be, as examples, a polymer, a metal, or a ceramic. The build material that is to be used may be, as examples, powdered or granular. Some of the 3D printers that use a powdered build material also include a print head with nozzles to apply liquid on the build material. In these printers, the dispensing device periodically distributes a horizontal layer of the build material from a reservoir onto the platform, forming a layer of build material on or over the receiving platform. The print head moves over the receiving platform and its nozzles selectively apply or eject drops of an energy absorbing fusing agent and a detailing agent, which may include a coolant, such as water. In some examples the print head may be used for applying drops of a coloring agent or another liquid in a selected pattern across the layer of the build material on the platform. The selected pattern for the liquids may be based on data derived from a 3D model of an object that is to be built by the printer. In various examples, the dispensing device includes an inkjet-type print head or a plurality of print heads to print the liquid or liquids on the build material to achieve a selected pattern for the liquid(s). Broadly, the printing of a liquid by a print head is an example of a spraying process. A spray pattern for a print head may also be called a print pattern. The heater, which may also be called a thermal energy source, radiates energy to the deposited build material to melt, sinter, fuse, or otherwise coalesce those portions on which the fusing agent has been printed; whereas, portions that lack fusing agent do not heat sufficiently to melt, sinter, fuse or otherwise coalesce. The heater may include a heating element or lamp that may emit light such as infrared and/or visible light, as examples. The heater may be stationary or may move relative to the platform and the build material thereon. The movement of the heater may be synchronized with the movement of the dispensing device or the movement of the print head.

The build surface includes a buildable region and a thermal boundary region. After a layer of build material has been spread over the build surface, on a portion or portions of the buildable region, the controller causes the liquid applicator to apply selectively the fusing agent and, in some examples, other liquids to form an object area or object portion. The object portion is a portion or layer of the 3D object that is to be created. On a portion or portions of the buildable region (e.g., around the perimeter of an object portion), the controller causes the applicator to apply selectively the detailing agent to build material to regulate the temperature in the build material that received the detailing agent. On a portion or portions of the thermal boundary region, the controller causes the applicator to apply selectively the detailing agent to build material to form a reference area or reference portion to provide a temperature comparison that may be used to regulate the temperature in a different portion of the build material, such as build material in the object portion. Due to the different liquid agents that are applied, when heated with irradiation from a common source, the object portion is anticipated to achieve a higher temperature than the reference portion. In some examples, the reference portion may be called a production reference portion. The temperature difference, or equivalently, the temperature offset between these two areas may be consistent and predetermined. The temperature offset may be based on the heat absorption and evaporative characteristics of the detailing agent and the fusing agent. In some examples, the detailing agent has a low emissivity, the fusing agent has a high emissivity, and both agents include water. A target temperature may be known for the object portion. Based on the target temperature and the temperature offset, a temperature set-point is established by the controller for the reference portion.

As the operation continues, the thermal imaging device views some of the build surface, or the entire build surface, providing spatially resolvable temperature data, including data for a temperature measurement of the reference portion. The controller makes a comparison between the measured temperature of the reference portion and the temperature set-point for the reference portion. Based on this comparison, the controller regulates the power level for thermal energy source to cause the temperature of the reference portion match the temperature set-point. In various examples, a result is that the object portion may match the target temperature. In the comparison, the controller accounts for the known temperature offset between the reference portion and the object portion.

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

When applied in a printing process to produce objects, the concepts disclosed herein may, for example, reduce spatial temperature variation during manufacturing or may provide another process benefit. As comparison to an object printed by another method, differences in a printed object built as describe herein may include modified or more uniform material properties within the printed object, greater dimensional accuracy, reduced defects, and greater color accuracy when colors are used. The concepts disclosed herein may allow, for example, objects that are being built to be more closely spaced when building multiple objects simultaneously. Any of these benefits may make a printer more economical to operate or more desirable to use.

Referring now to the view of FIG. 1, an electronic device for additive manufacturing in accordance with the principles disclosed herein is shown. In this example, the electronic device is a 3D printer 100. Printer 100 includes a housing 102 for which a coordinate system may be defined by an x-axis, a y-axis, and a z-axis. In this example, the three axes are orthogonal with the x-axis extending lengthwise (left and right in FIG. 1), the y-axis extending widthwise (into and out of the page in FIG. 1), and the z-axis extending vertically (up and down in FIG. 1). The z-axis may also be called an elevation axis, referring to an elevation of an object that may be built by printer 100.

In housing 102, printer 100 includes an applicator 112 (to apply one or more of a coloring agent, a fusing agent, a detailing agent, or another liquid), a material feed mechanism or dispensing device 116 (to form sequential layers of build material 117 on a build surface 118), a thermal energy source 120, a carriage system 122, a thermal imaging device 123, and a controller 125. Applicator 112 includes a print carriage 114 that carries one or multiple print heads 115 having nozzles to deliver liquid droplets in selected patterns by spraying or ejection. Print carriage 114, dispensing device 116, and thermal energy source 120 are slidingly mounted to carriage system 122 to move back-and-forth parallel to the x-axis across build surface 118. As examples, carriage system 122 may include a guide bar and a common drive mechanism to move print carriage 114, dispensing device 116, and thermal energy source 120, or system 122 may include separate drive mechanisms or guide bars for components 114, 116, 120, to move them together or separately. In some examples, build material 117 is powdered or granular, and the depositing process of dispensing device 116 includes spreading a pile of build material 117 across build surface 118. The detailing agent includes a coolant and may be called a coolant or cooling agent. In various examples, the detailing agent is water or is water-based and may be optically clear (for example, in the visible portion of the electromagnetic spectrum 400-700 nm). In additive manufacturing processes that do not use a detailing agent, or the detailing agent is not a coolant, then another source of cooling agent may be applied with applicator 112.

Thermal energy source 120 may also be called a heater assembly or fuser module. Thermal energy source 120 includes a plurality of heating elements or lamps to provide radiant heat to build material 117 on build surface 118. Thermal energy source 120 includes a warming lamp 161 and an array of fusing lamps 162. In general, warming lamps 161 is to provide a first spectrum of radiant thermal energy to heat build material 117, whether or not fusing agent or detailing agent is applied. In general, fusing lamps 162 are to provide a second spectrum of radiant thermal energy suited to heat and fuse regions of build material 117 on which the fusing agent is applied and to heat regions of build material on which the detailing agent is applied. Controller 125 is capable of providing a first power level to the warming lamp 161 and a second power level to the multiple fusing lamps 162. The first and second power levels may be separately increased, decreased, or maintained by controller 125. As a heat producing component of thermal energy source 120, a lamp 161, 162 may also be called a thermal energy source. In some examples, lamps 161, 162 include quartz infrared halogen heat sources. Other examples of a thermal energy source may include other heater filament configurations, other types of lamps, or other quantities of lamps 161, 162. Some examples have a single type of lamp or a single lamp.

Controller 125 is to govern the operation of the various components of printer 100. Controller 125 is to cause printer 100 to perform an initialization process that includes depositing and heating multiple preliminary layers of build material. Following the initialization process, the controller 125 is to cause printer 100 to build (e.g., to print) a fused, three-dimensional (3D) object. The heating that occurs while building the 3D object is governed by closed-loop control of thermal energy source 120 by controller 125, using temperature measurements from thermal imaging device 123, which may be an infrared (IR) camera.

Thermal imaging device 123 includes an array of heat sensitive elements, or pixels, to provide spatially resolvable temperature data. Thermal Imaging device 123 may have a field of view that includes all or a portion of build surface 118. Controller 125 may choose to measure a temperature using all or a portion of the field of view of thermal imaging device 123. A region of interest (ROI) may be selected to reference the portion of the field of view to be used by thermal imaging device 123 or controller 125 when measuring temperature. The ROI is chosen to view a selectable area or region of build surface 118, which may be called a reference area. The term ROI may then refer to a selected pixel or a plurality of pixels of thermal imaging device 123 or to the reference area on build surface 118 that is viewed by those pixels. In some examples, controller 125 has established a relationship between an X-Y coordinate system of build surface 118 and the field of view (e.g., the pixels) of thermal imaging device 123. The pixels within the selected ROI may be associated with the particular X-Y coordinates of a selected reference area. In some examples, pixels within the selected ROI of the thermal imaging device 123 are used to establish X-Y coordinates for the reference area on build surface 118 or for build surface 118 as a whole. A measured temperature may be averaged for the entire ROI, which may be called a spatially averaged temperature. In some examples, a measured temperature, or multiple measured temperatures taken simultaneously, may be evaluated from a portion or from multiple portions of the ROI, respectively.

In the example of FIG. 1, build surface 118 is part of a movable platform 126 disposed in a bin 124. Platform 126 and build surface 118 are vertically adjustable along the z-axis by a drive or lift mechanism 128, which is vertically movable relative to dispensing device 116 and thermal energy source 120, as examples. Lift mechanism 128 is to move platform 126 vertically downward along the z-axis in increments to allow build surface 118 to receive sequential layers of build material 117 that builds upon the previous layers. The applicator 112 may selectively apply drops of a fusing agent or a detailing agent. In some examples applicator 112 may be used for applying drops of a coloring agent or another liquid to the formed layer of build material. The layer may next be heated by thermal energy source 120 passing over it. Portions of the layer on which fusing agent was applied may melt, sinter, or otherwise coalesce in response to being heated by thermal energy source 120. During this printing process, an outer or upper layer 129 of build material 117 provides a build surface 130 for a subsequent layer of build material. Thus, as sequential layers of build material are added, the previous layer includes a new build surface 130 for the next layer. In this manner, an object being printed may be built in three-dimensions.

Like various other components, bin 124 with movable platform 126 may be intended for customer-installation into housing 102 or be removable from housing 102. Removal or installation of bin 124 may be accomplished to facilitate shipping, for replacement or repair, for removal of a printed object following a print operation, or for another reason. In some examples, bin 124 with platform 126 is mounted in a separate housing. The separate housing may couple to housing 102 to form the assembly.

Figure 2:
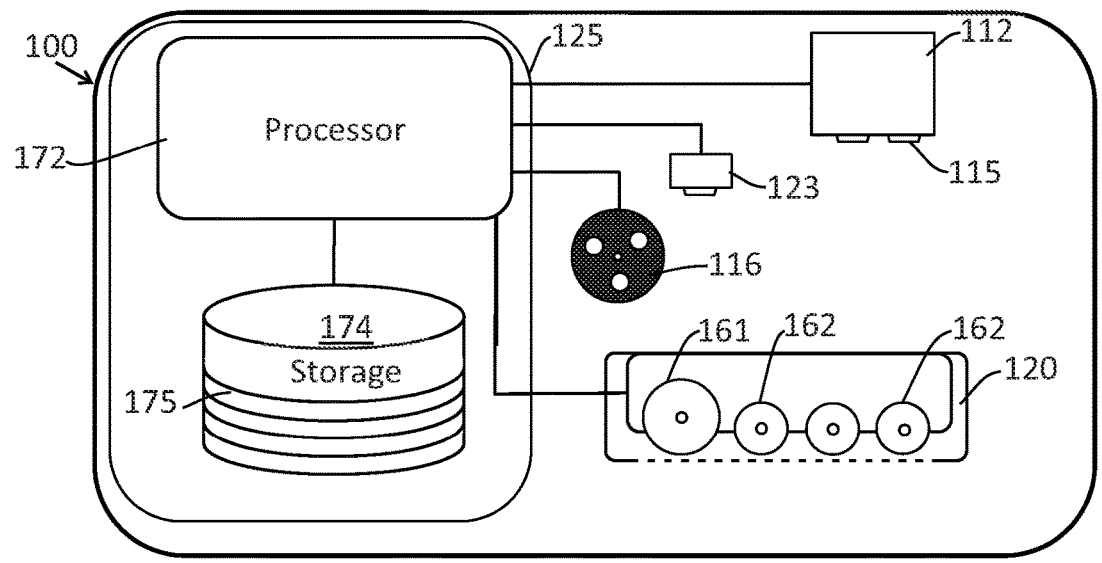
FIG. 2 shows a schematic view of the 3D printer of FIG. 1 in accordance with various examples.

As shown in FIG. 2, controller 125 includes a processor 172 and a computer-readable storage medium 174. Controller 125 is coupled for communication with applicator 112, thermal imaging device 123, heat lamps 161 and fusing lamps 162 of thermal energy source 120, and dispensing device 116. Storage 174 stores machine executable code to be executed by processor 172. In various examples, machine executable code may also be called machine readable instructions or computer executable code. The machine executable code stored in storage 174 includes code 175. Code 175 includes instructions that, when executed by controller 125, cause controller 125 (e.g., its processor 172) to perform various operations in printer 100, including the printing of 3D objects based on predefined design information or received design information. Code 175 includes instructions that, when executed by controller 125, cause controller 125 to initialize printer 100 to utilize reference areas for measuring temperature prior to printing of 3D objects and to utilize the reference areas later, while printing 3D objects, as is disclosed herein according to various examples.

Figure 3A:
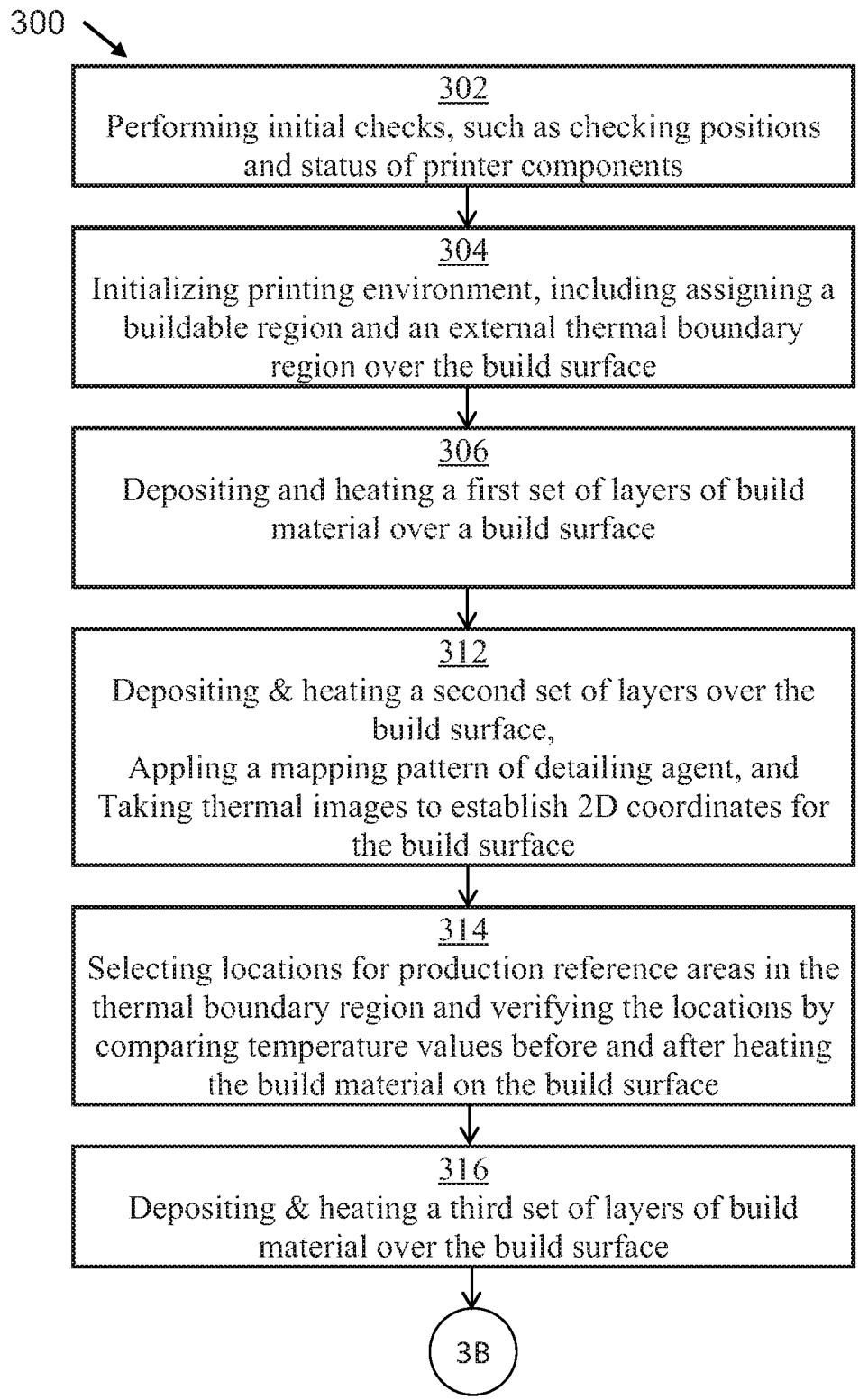
FIGS. 3A and 3B show a flow diagram of a method of operating an additive manufacturing process, such as the 3D printer of FIG. 1, in accordance with various examples.
Figure 3B:
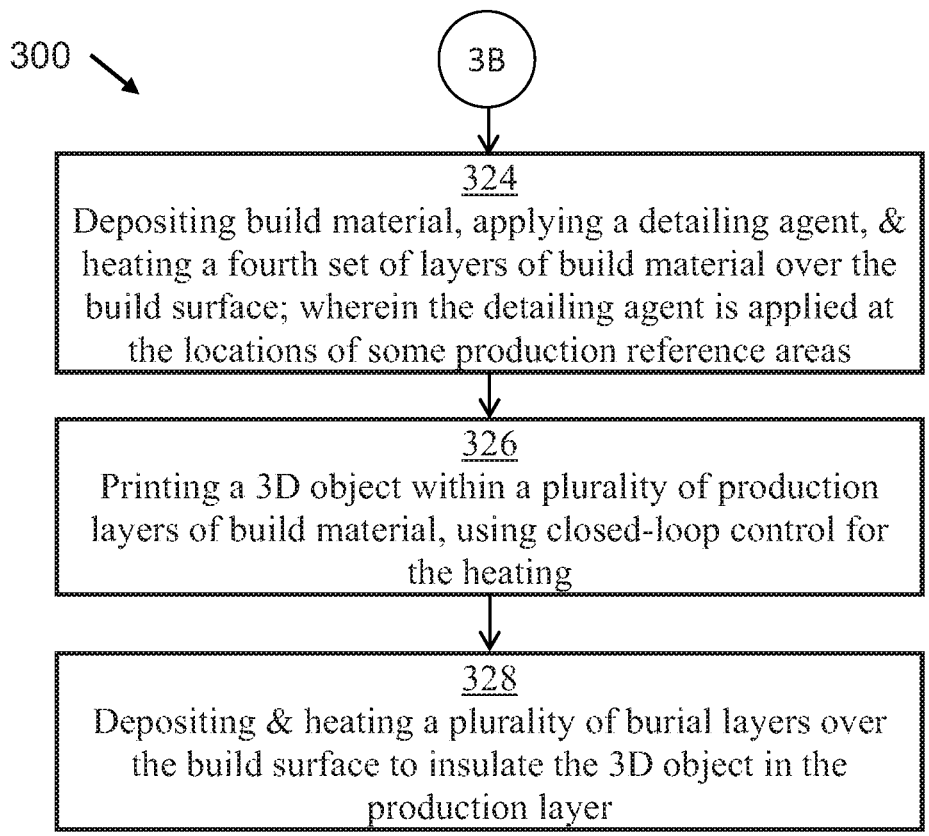

Referring now to the flow chart of FIGS. 3A and 3B, an example is depicted of a process or method 300 for operating an additive manufacturing process. Method 300 includes an initialization process for printer 100 and a process for performing 3D printing activity to produce a user-selected or user-configured 3D object after initialization is completed. Examples of utilizing method 300 will be explained in terms of operations of printer 100, as may be accomplished by various components governed by controller 125 executing various portions of code 175 (FIG. 2). Method 300 may be applicable to other additive manufacturing systems as well. The discussion of method 300 will be aided by FIG. 4, which shows a top view of printer 100 prior to adding any layers of build material, and by FIG. 5, which shows a side view of printer 100 with preliminary layers 190 of build material deposited over movable platform 126. The preliminary layers 190 will be described as comprising several sets of layers, and some of these sets of layers may be processed differently than other sets of layers. For example, a set of the preliminary layers 190 may be deposited before thermal energy is applied to them, and another set of the preliminary layers 190 may be built such that an individual layer is deposited and heated before a subsequent layer is deposited and heated. In FIG. 5, dispensing device 116 is vertically retracted from build surface 130 during a heating pass performed by thermal energy source 120. During the initialization process, controller 125 may provide a fixed power level to lamps 161, 162 to apply thermal energy to the preliminary layers 190.

Referring to FIG. 3A, at block 302 of method 300, controller 125 is to perform initial checks of printer components, which may include determining the relative positions and the status of applicator 112, dispensing device 116, and build surface 118 of movable platform 126.

Figure 4:
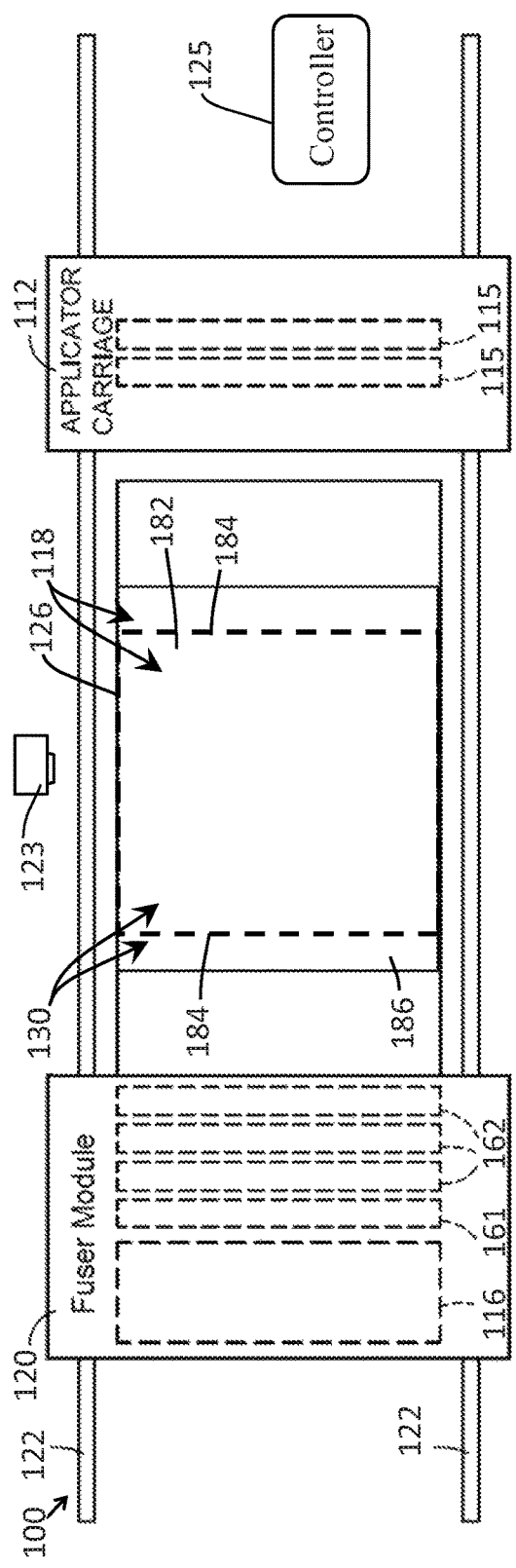
FIG. 4 shows a top-view schematic representation of the 3D printer of FIG. 1, showing regions on the build surface, in accordance with various examples.
Figure 5:
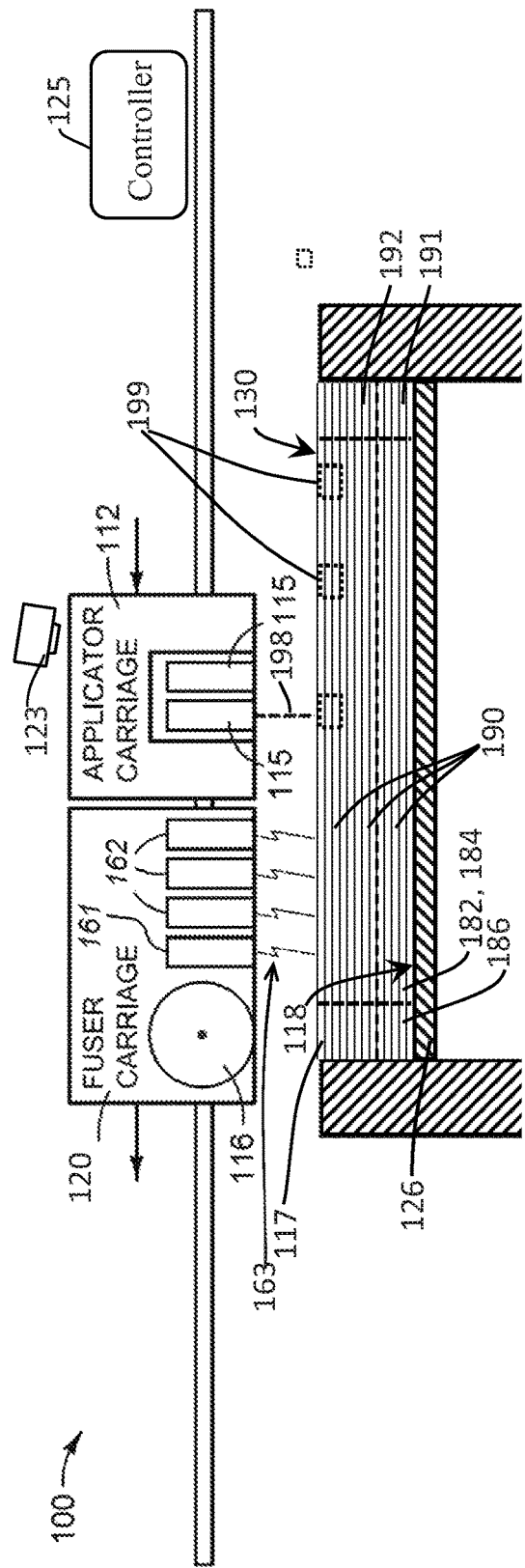
FIG. 5 shows a side-view schematic representation of the 3D printer of FIG. 1 in partial cross-section showing layers of build material over the build surface during an initialization process, in accordance with various examples.

Referring now to FIG. 3A and FIG. 4, at block 304, controller 125 is to initialize a printing environment, including assigning or dividing build surface 118 to include a buildable region 182 having a perimeter 184 and a thermal boundary region 186 disposed outside the perimeter 184. FIG. 4 represents a time prior to depositing build powder, so the current build surface 130 may coincide with the physical build surface 118 of movable platform 126.

Referring to FIG. 3A and also FIG. 5, at block 306 printer 100 is to deposit a first set of layers 191 of build material 117 over build surface 118 of movable platform 126. The first set of layers 191 is a portion of preliminary layers 190. The initial layer of the first set of layers 191 may be placed directly on build surface 118, for example. Printer 100 is to heat the first set of layers 191 using thermal energy source 120 moving left and right and by using thermal imaging device 123, governed by controller 125. Thermal energy source 120 may move back and forth (e.g., left and right) over build area 118 a plurality of times while applying radiant thermal energy 163, e.g., heating, the build material. In some examples, the first set of layers 191 includes layers of build material that add up to a bed thickness of approximately 5 mm.

At block 312, printer 100 is to perform spatial calibration activities between the bed of build material 117 on movable platform 126 and thermal imaging device 123. For example, at block 312, a second set of layers 192 may be deposited over build surface 118 and over the first set of layers 191 and may be heated. A horizontal dashed line in the build material 117 represents the boundary between adjoining sets 191, 192 within the preliminary layers 190. Applicator 112 of printer 100 is to apply detailing agent 198 in a selected two-dimensional (2D) pattern 199 across a layer of build material 117. Thermal imaging device 123 is to take a thermal image of a layer of build material 117. Due to its intended use, pattern 199 (for the detailing agent) may be called a mapping pattern 199. FIG. 5 shows a portion of mapping pattern 199. In some examples, mapping pattern 199 includes multiple circles. This process includes deposition, heating, and applying the mapping pattern 199 of detailing agent and may be repeated for a plurality of the layers of the second set 192. In some examples, five layers of build material 117 are utilized in block 312.

Figure 6:
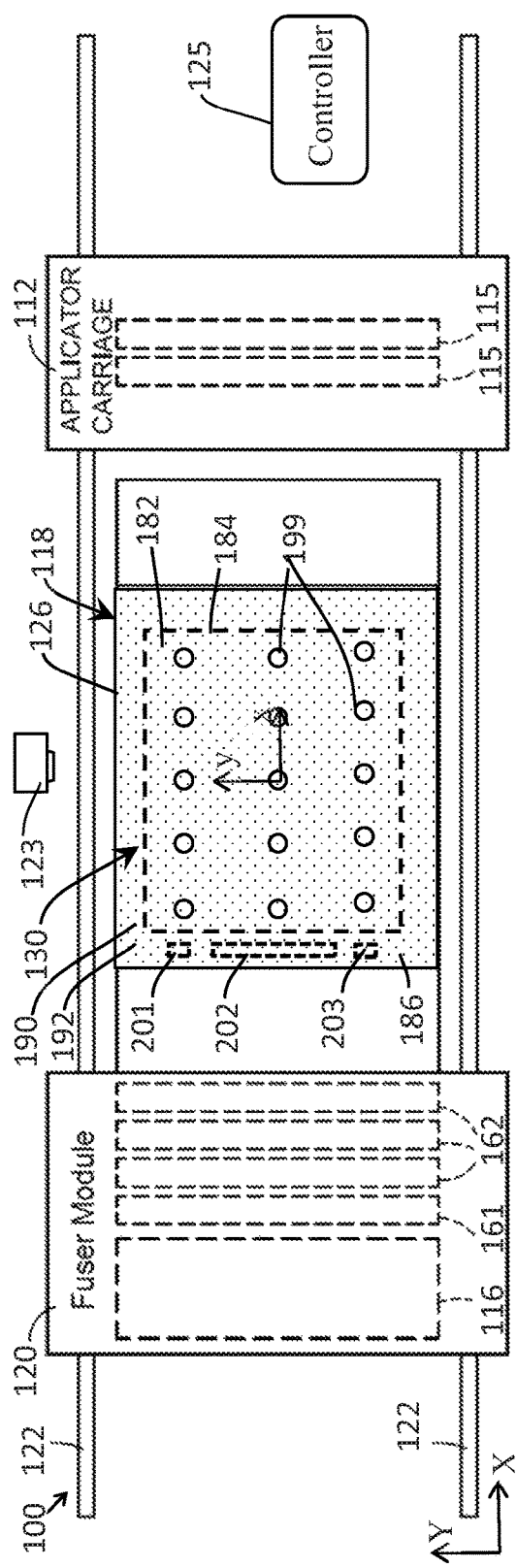
FIG. 6 shows a top-view schematic representation of the 3D printer of FIG. 1 showing build material and reference regions on the build surface, in accordance with various examples.

Continuing with block 312 and referring to FIG. 6, based on thermal image data of the mapping pattern 199 from a layer or layers of the second set 192, controller 125 of printer 100 is to utilize or to establish two-dimensional (2D) coordinates for the build surface 118, e.g., machine coordinates X-Y or localized coordinates x-y, and is to map pixels of thermal imaging device 123 to the coordinates. In some examples, evaluating the thermal image or images to utilize or to establish the 2D coordinates includes determining the center of those circles relative to pixels in thermal imaging device 123 relative to the build area 118, 130, or relative to the range of travel of applicator 112. Examples of some of the activities and the results of block 312 are provided in Patent Cooperation Treaty Patent Application No. PCT/US2018/037962.

In general during 3D printing, temperature measurements may be taken in reference areas inside or outside buildable region 182 by thermal imaging device 123 and may help calibrate and control manufacturing components and processes. For method 300, after the initialization process is completed, while production layers are deposited, temperature measurements are made outside buildable region 182, within thermal boundary region 186 with the aid of production reference areas or production reference portions that are to be defined in block 314, below.

Continuing to reference FIG. 3A and FIG. 6, at block 314 the initialization process continues. FIG. 6 shows a top view of printer 100 with second set 192 of the preliminary layers 190 visible. Printer 100 is to select locations for a plurality of production reference areas within thermal boundary region 186, outside buildable region 182, based on the 2D coordinates developed in block 312 using mapping pattern 199 of the second set 192 of layers. In this example, three production reference areas 201, 202, 203 are defined with reference areas 201, 203 having equal size and reference area 202 being larger than areas 201, 203 and disposed between areas 201, 203. The perimeter of each reference area 201, 202, 203 is depicted by dashed lines in FIG. 6. The locations and sizes for areas 201, 202, 203 may be preprogrammed within code 175 of storage 174, may be determined by controller 125 during operation, may be provided by a user, or may be determined using a combination of these sources, as examples. Reference areas 201, 202, 203 provide locations where temperature measurements of build material may be made consistently without including an area that may have layers that fluctuate between fused and unfused build material, as may occur in buildable region 182 when a 3D object is being printed therein.

Block 314 continues with printer 100 measuring temperatures in the reference areas 201, 202, 203 before a pass over the layers of build material is made by thermal energy source 120. Temperatures in the reference areas 201, 202, 203 are measured again after the heating pass is completed. Controller 125 compared the temperatures in areas 201, 202, 203 before the heating pass to the temperatures in areas 201, 202, 203, respectively, after the heating pass. Prior to this particular pass of energy source 120, the layers of build material had been heated by energy source 120. This latest heating pass again irradiates the upper surface of the build material with thermal energy. As a result of these heating activities and the time transpired between them, the temperatures before and the temperatures after the heating pass should differ by no more than a predetermined threshold temperature difference, which is 3° C. in some examples. If controller 125 determines that the actual temperature difference is greater than the threshold temperature difference, a reference areas 201, 202, 203 may be misplaced and does not adequately correspond or does not fully correspond to a location where build material has been deposited. In such a situation, controller 125 is to reselect the misplaced reference area 201, 202, 203 or all of these reference areas. If, instead, the actual temperature differences are all equal to or less than the threshold temperature difference, the initiation process proceeds. Thus, controller 125 verifies the locations of the reference areas 201, 202, 203 by comparing before and after temperature values that result from applying thermal energy to the build surface. In addition to the components discussed here, FIG. 6 includes several of the reference numerals for components described for FIG. 4, above. Examples of some activities and results of block 314 are provided in Patent Cooperation Treaty Patent Application Number PCT/US2018/037962.

Figure 7:
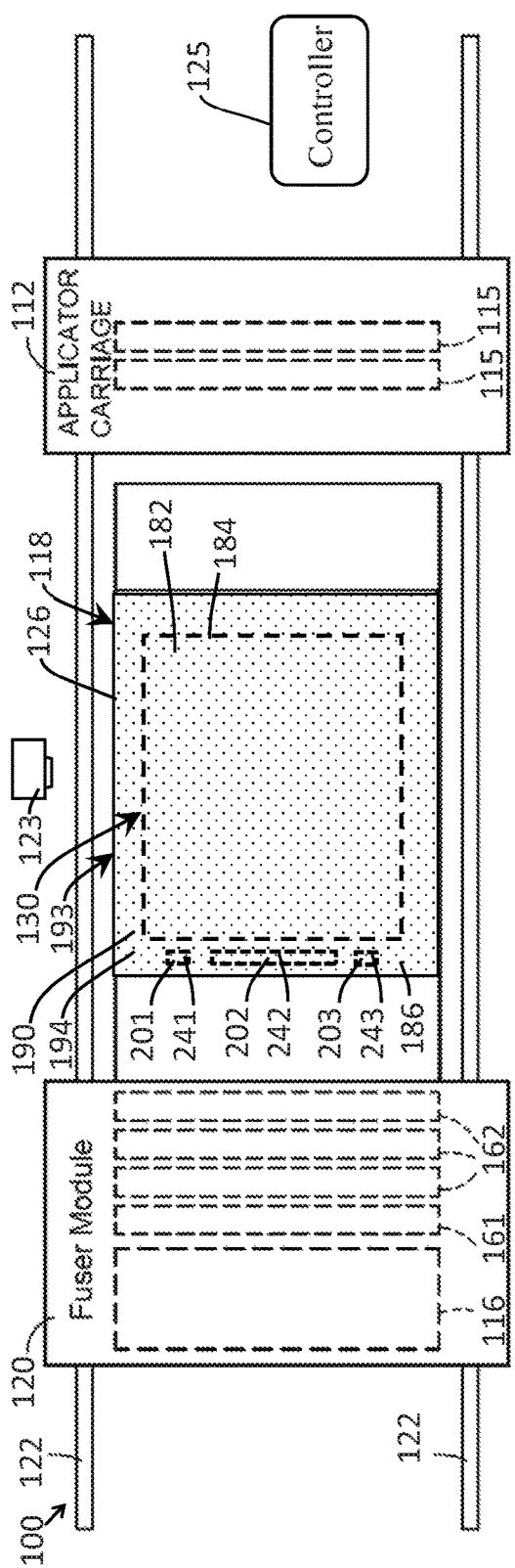
FIG. 7 shows a top-view schematic representation of the 3D printer of FIG. 1 showing build material and reference regions on the build surface, in accordance with various examples.

Referring to FIG. 3A and FIG. 7, at block 316, the initiation process is to continue, and printer 100 is to deposit a third set of layers of build material 117 over build surface 118 and over the second set of layers 192 (FIG. 6) and is to heat the third set of layers 193 using thermal energy source 120. (Note: In FIG. 7, the third set 193 is underneath a fourth set of layers 194). Moving thermal energy source 120 over the build surface 118 to apply thermal energy may occur between the depositions of various layers of the third set, for example, between each individual layer of the third set. In some examples, the third set includes 45 layers of build material.

Referring now to FIG. 3B and FIG. 7, at block 324, printer 100 is to deposit the fourth set of layers 194 of build material 117 over build surface 118 and over the third set of layers 193 across build surface 130, to apply detailing agent to reference areas 201, 203 on individual layers of the fourth set of layers 194, and to heat the layers using thermal energy source 120. With the application of detailing agent 198, reference areas 201, 203 define production reference portions 241, 243 within the individual layers of the fourth set of layers 194. For convenience, within the individual layers of the fourth set of layers 194, a production reference portion 242 may be defined to include reference area 202 and the portion of the individual layer that lies under reference area 202. This portion of the layer includes uncoated or bare build material, and, therefore, reference portion 242 includes uncoated or bare build material. Bare portions of a layer lack fusing and detailing agents. Thus, a layer of the fourth set of layers 194 includes reference portions 241, 242, 243, as well as the build material disposed in the remainder of thermal boundary region 186 and the build material disposed in buildable region 182. In other words, reference portions 241, 242, 243, are portions of a layer of the fourth set of layers and are disposed in the thermal boundary region 186. Production reference portions 241, 242, 243 may also be simply called reference portions 241, 242, 243.

Reference portions 241, 243 include build material and detailing agent, which, in some examples, eventually evaporates. Reference portions 241, 242, 243 remain unfused due to a lack of fusing agent. Some other examples may include some fusing agent in a portion of reference portions 241, 242, 243, however, a portion of the reference portions 241, 242, 243 may lack fusing agent. In some examples, the fourth set of layers includes seventy-five layers of build material. In some examples, controller 125 is to form the reference portions 241, 242, 243 based on data generated by printer 100 or data stored within the printer 100 and not provided by an end user.

A goal is to create reference areas 201 and 203 having reference portions 241, 242, 243, respectively, such that the temperature of the build material in a reference area is at a constant difference from, or otherwise corresponds uniformly to, the temperature of various portions of build material in the buildable region when production layers are built after the initialization process is completed. A specific pixel or a plurality of pixels of thermal imaging device 123 may be mapped to the locations of each reference portion 241, 242, 243. In one example, the selected locations of the reference portions 241, 242, 243 remain unchanged relative to movable platform 126 during manufacturing. Accordingly, the mapping between various pixels of thermal imaging device 123 and the reference portions 241, 242, 243 remains unchanged. In another example, or one or more of the reference portions 241, 242, 243 may be moved while building an object, and sensor pixels of thermal imaging device 123 may be remapped to the new location or locations during operation based on a mapping transform function. Remapping of pixels may be performed, for example, to optimize heating performance of thermal energy source 120 for various layers of build material.

In the present example, block 324 of FIG. 3B represents the completion of an initialization process of printer 100, and the preliminary layers 190 include the first set, the second set, the third set, and the fourth set of layers (191, 192, 193, 194) of build material 117. In some examples, the preliminary layers 190 include more or fewer layers or include greater or lesser total thickness than is discussed above. An additional layer may be placed before or after any of the first through fourth sets of layers. In some examples, a layer of build material 117 within the preliminary layers 190 has a thickness of 80 micrometers. In other examples, a layer of build material 117 within preliminary layers 190 has thicknesses that are greater than or less than 80 micrometers. In some examples, the preliminary layers 190 of build material 117 have a total bed thickness of approximately 25 mm or approximately one inch.

Figure 8:
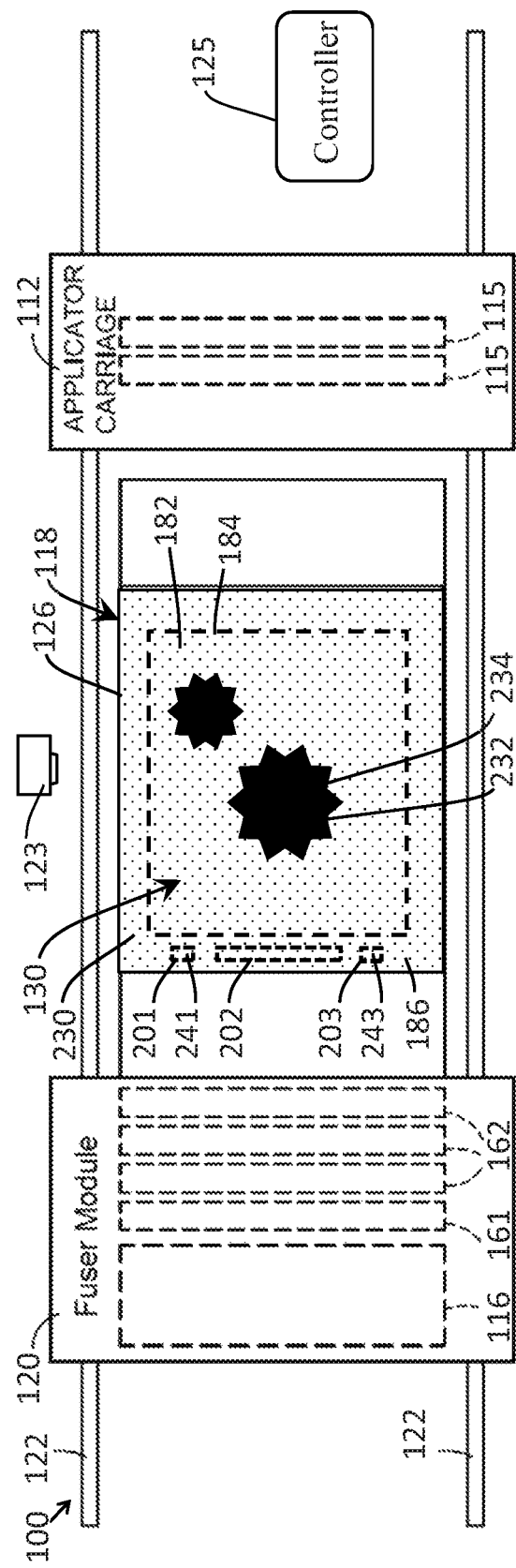
FIG. 8 shows a top-view schematic representation of the 3D printer of FIG. 1 showing production layers of build material after the initialization process, in accordance with various examples.

Referring to FIG. 3B and the top view of FIG. 8, at block 326, printer 100 is to perform 3D printing activity. Printer 100 sprays (e.g., prints) fusing agent on a plurality of production layers 230 of build material 117 to form a user-selectable or configurable 3D object 232. In some examples, the design of the 3D object is based on data provided by a data source that is external to the additive manufacturing system. FIG. 8 includes many of the reference numerals described for FIG. 6 and FIG. 7. In the printing process, dispensing device 116 is to deposit a plurality of production layers 230 of build material 117 over build surface 118 and over the preliminary layers 190 (FIG. 7). Governed by controller 125, applicator 112 is to apply selectively fusing agent to the plurality of the production layers 230 to form a plurality of vertically stacked object portions 234. An object portion 234 is visible on the build surface 130 of the uppermost layer that is shown. Applicator 112 is to apply selectively detailing agent to the reference areas 201, 203 of the plurality of production layers 230 to form a plurality of vertically stacked production reference portions 241, 243. Production reference portions 241, 243 refer to the build material within production reference areas 201, 203, which receive detailing agent. The locations of production reference areas 201, 202, 203 and the corresponding production reference portions 241, 242, 243 are defined as described for block 324, above. With respect to a horizontal plane, the object portions are located in the buildable region 182 and the production reference portions 241, 243 are located in the thermal boundary region 186. In addition to the fusing agent, controller 125 may also cause applicator 112 to apply selectively coloring agent, detailing agent, or another liquid agent to the build material based on a design for the 3D object 234. The expression "object portion" refers to the portion or portions of build material that receive fusing agent within buildable region 182 to produce 3D object 234. The production reference portions 241, 243 in thermal boundary region 186 are spaced apart horizontally from the object portions 234 in buildable region 182.

In this example, the fusing agent includes black ink, and so object portion 234 is black. In this example, the detailing agent is a clear liquid, and so production reference portions 241, 243 have the same color as the build material and may be described as being invisible to the human eye, before or after the detailing agent has evaporated. Production reference portions 241, 242, 243 of production reference portions 230 lack fusing agent. Some examples may include some fusing agent in a reference portion, but a portion of the layer lacks fusing agent. In some examples, thermal imaging device 123 is to measure the temperature of a reference portion 241, 243 using the portion of the reference portion that lacks fusing agent. In other examples, thermal imaging device 123 is to measure the temperature of the entire reference portion 241, 243 even if a portion of the reference portion has fusing agent. In these examples, the temperature measured by the thermal imaging device 123 is to be representative of or an approximation of the portion of production reference portions 241, 243 that lack the fusing agent.

Still at block 326, printer 100, with controller 125, is to heat individual layers of the production layers using closed-loop control of thermal energy source 120. During the closed-loop control, controller 125 is to cause thermal imaging device 123 to take a thermal image of the three production reference portions 241, 242, 243. Controller 125 is to compare the temperatures of production reference portions 241, 243 with a first temperature set-point and is to regulate or control a power level or the travel speed of thermal energy source 120, making an adjustment when appropriate. In this process, controller 125 may adjust the power level for fusing lamps 162 while leaving the power level to warming lamps 161 unchanged or may adjust the power levels of lamps 162 and lamp 161. Controller 125 may compare the temperature of production reference portion 242 with a second temperature set-point and is to regulate a power level or the travel speed of thermal energy source 120, making an adjustment when appropriate. In this process, controller 125 may adjust the power level for warming lamps 161 while leaving the power level to fusing lamps 162 unchanged or may adjust the power levels to lamp 161 and lamps 162. The closed-loop control process is repeated periodically or according to a sequence of events.

The first temperature set-point corresponds uniformly to a target temperature for fused build material in the object portions 234 in buildable region 182. With the application of the detailing agent 198, which includes a coolant, the temperatures of production reference portions 241, 243 are anticipated to be lower than a temperature of the build material having fusing agent in buildable region 182. Controller 125 may use this known or estimated temperature offset or difference to select the first temperature set-point for production reference portions 241, 243. In this situation, the first temperature set-point used by controller 125 is less than a target temperature for the object portion 234, differing by the temperature offset, which may be a predetermined or fixed value in some examples. Thus, the temperature set-point for the reference portion may be based on a target temperature for the object portion.

The second temperature set-point corresponds uniformly to a target temperature for uncoated or unfused build material in buildable region 182. Thus, applying thermal energy governed by closed-loop control to heat the production layers includes measuring a temperature in the thermal boundary region 186 outside the buildable region 182 and comparing that temperature with a temperature set-point for uncoated or unfused build material in production reference portion 242.

In block 326, the application of thermal energy heats the production reference portions 241, 242, 243 and heats and fuses the object portions 234 to become a three-dimensional object 232. 3D object 232 is spaced apart from production reference portions 241, 243 in thermal boundary region 186. The spray pattern for fusing agent and other liquid agents may change from one production layer to the next.

Thus, referring to FIGS. 3A and 3B, during the initiation activities of blocks 302 to 324, little or no fusing agent is applied within the buildable region 182, but at block 326, applicator 112 applies fusing agent within the buildable region 182 in sufficient quantities to produce the 3D object 232 in buildable region 182. In various examples, none of the 3D object 232 extends into the preliminary layers 190 (FIG. 7) of build material 117. In other examples, a portion of the 3D object 232 may extend into or be fused to build material 117 in some of the preliminary layers 190. As a result of method 300, a majority of the preliminary layers 190 lack build material 117 that is fused to the 3D object 232 in buildable region 182. As is to be understood from the term majority, in some examples, the majority of the preliminary layers 190 include all the preliminary layers. In various examples, the 3D object 232 in buildable region 182 is designed or intended for a purpose beyond the printing process that forms it.

At block 328, printer 100 is to deposit and heat a plurality of burial layers over the build surface and over the production layers to insulate the 3D object in the production layers. The order of execution or completion of some of the blocks in method 300 may be modified in various examples.

In various examples, the heating of an individual layer of the preliminary layers 190 may include a single pass or may include multiple passes of thermal energy source 120 over build surfaces 118, 130 between the depositions of the various individual layers. In the disclosed example of method 300, this possibility may be applied to production layers. A temperature set-point may be replaced by multiple temperature set-points for thermal energy source 120 to heat a layer of build material 117 using multiple passes. The temperature set-point for any of the sets of layers that form preliminary layers 190 may also be replaced with multiple temperature set-points when, for example, thermal energy source 120 makes multiple passes to heat the first set of layers.

Figure 9:
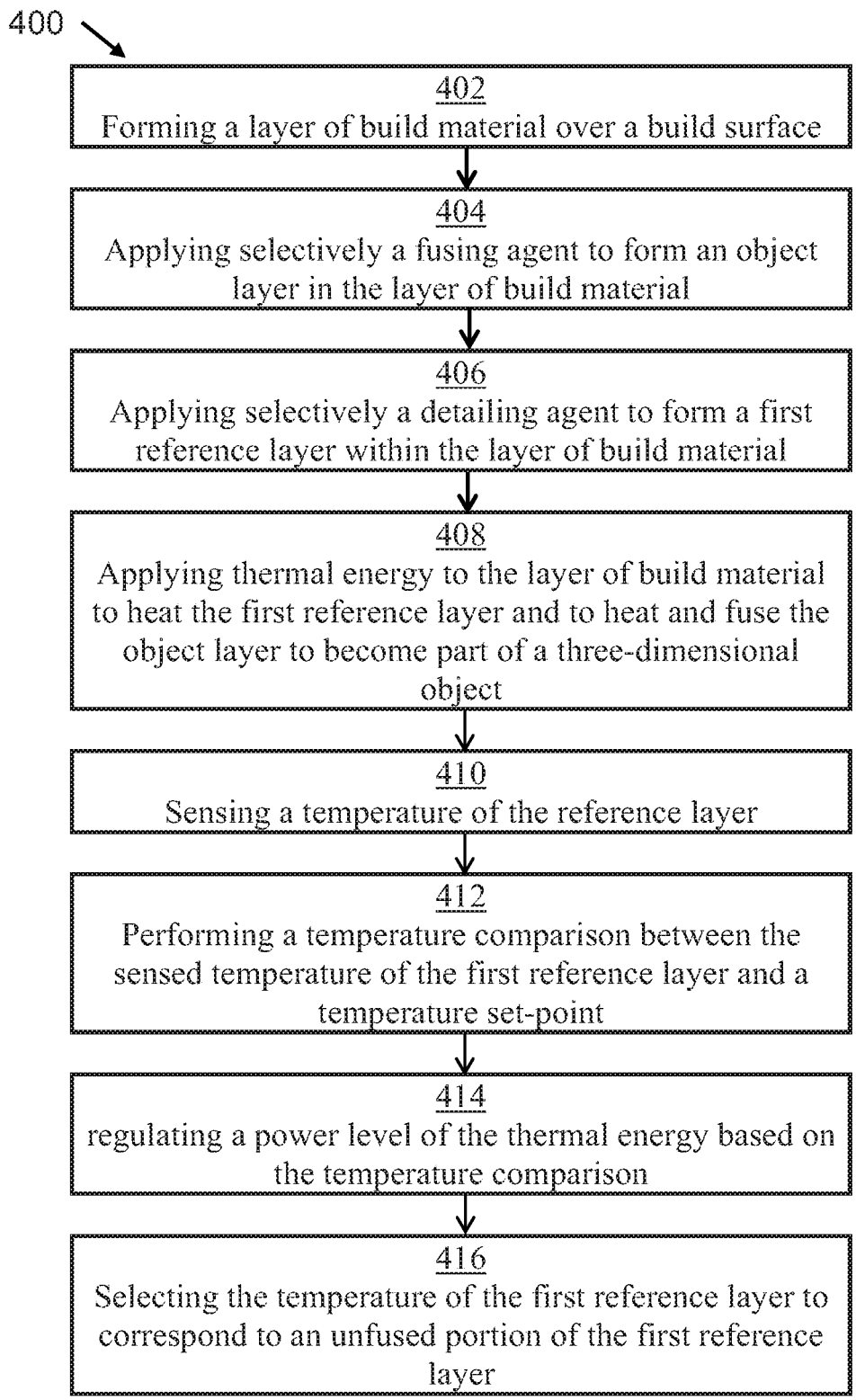
FIG. 9 shows a flow diagram of another method of operating an additive manufacturing process, such as the 3D printer of FIG. 1, in accordance with various examples.

FIG. 9 shows a method 400 for operating an additive manufacturing process in accordance with various examples described herein. At block 402, method 400 includes forming a layer of build material over a build surface. Block 404 includes applying selectively a fusing agent to form an object portion in the layer of build material. Block 406 includes applying selectively a detailing agent to form a first reference portion within the layer of build material. Block 408 includes applying thermal energy to the layer of build material to heat the first reference portion and to heat and fuse the object portion to become part of a three-dimensional object. Block 410 includes sensing a temperature of the reference portion. Block 412 includes performing a temperature comparison between the sensed temperature of the first reference portion and a temperature set-point, and block 414 includes regulating a power level of the thermal energy based on the temperature comparison. As indicated in block 416, the temperature of the first reference portion corresponds to an unfused portion of the first reference portion.

In some examples of method 400, the three-dimensional object is formed in a buildable region of the build surface, and the first reference portion is formed in a thermal boundary region outside the buildable region. Some examples of method 400 include:

- depositing a second layer of build material on the previously deposited layer of build material;
- applying selectively the fusing agent to form a second object portion in the second layer of build material;
- applying selectively the detailing agent to form a second reference portion in the second layer of build material;
- applying thermal energy with the regulated power level to heat the second reference portion and to heat and fuse the second object portion to become part of the three-dimensional object;
- sensing a temperature of the second reference portion;
- performing a temperature comparison, between the sensed temperature of the second reference portion and the temperature set-point; and regulating a power level of the thermal energy based on the temperature comparison of the second reference portion.

In some examples, the second reference portion is disposed over the first reference portion in a subsequent layer of build material, and the size and position of the second reference portion is equal to the size and position of the first reference portion. In various operations, method 400 includes several of the concepts described with regard to method 300 or other concepts disclosed herein and may be implemented using printer 100 governed by controller 125, as an example. Various examples of method 400 may include fewer operations than described, and other examples of method 400 include additional operations. In various examples, after completing method 400, a 3D object is produced in production layers. In addition, a reference portion, to be used for temperature control, may be disposed in a location that is spaced apart from the 3D object.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An additive manufacturing system comprising:
a dispensing device to deposit a layer of build material over a build surface;
an applicator to apply a fusing agent and to apply a detailing agent on the layer of build material,
a thermal energy source;
a thermal imaging device; and
a controller:
to cause the dispensing device to deposit the layer of build material over the build surface;
to cause the applicator to selectively apply:
the fusing agent to form an object portion in the layer of build material; and
the detailing agent to form a reference portion in the layer of build material, wherein the reference portion is outside a boundary of the object portion;
to cause the thermal energy source to:
heat the reference portion; and
heat and fuse the object portion;
to cause the thermal imaging device to measure a temperature of the reference portion, and
to regulate a power level of the thermal energy source based on a comparison between the temperature of the reference portion and a temperature set-point for the reference portion,
wherein the temperature set-point for the reference portion is based on a target temperature for the object portion.

2. The system of claim 1 wherein the controller is to define the build surface to comprise a buildable region having a perimeter and a thermal boundary region disposed outside the perimeter of the buildable region, and
wherein the controller is to control the applicator to dispose the object portion in the buildable region and to dispose the reference portion in the thermal boundary region.

3. The system of claim 1 wherein the thermal imaging device is to measure the temperature of the reference portion using the portion of the reference portion that is to lack the fusing agent.

4. The system of claim 3 wherein the entirety of the reference portion is to lack the fusing agent, and
wherein the detailing agent includes a coolant.

5. The system of claim 1 wherein the temperature set-point is less than the target temperature for the object portion, differing by a temperature offset.

6. The system of claim 1, wherein the controller is to:
determine the temperature set-point for the reference portion based on a target temperature for the object portion and a temperature offset between the reference portion and the object portion; and
perform the comparison between the temperature of the reference portion and the temperature set-point for the reference portion.

7. The system of claim 1, wherein the controller is to:
measure a first temperature at the reference portion before a pass by the thermal energy source;
measure a second temperature of the reference portion after the pass by the thermal energy source; and
verify a location of the reference portion based on a difference of the first temperature and the second temperature being less than a threshold amount.

8. The system of claim 1, wherein the controller is to regulate the power level of the thermal energy source based on a comparison between a temperature of a first reference portion and a first temperature set-point for the reference portion, wherein the first reference portion has a detailing agent applied thereon and the first temperature set-point corresponds to a target temperature for fused build material within a buildable region.

9. The system of claim 8, wherein the controller is to regulate the power level of the thermal energy source based on a comparison between a temperature of a second reference portion and a second temperature set-point for the reference portion, wherein the second reference portion comprises uncoated build material and the second temperature set-point corresponds to a target temperature for uncoated build material within the buildable region.

10. The system of claim 1, wherein:
the applicator is to apply the detailing agent in a selected two-dimensional (2D) pattern across a layer of build material; and
the controller is to establish 2D coordinates for the build surface based on thermal image data of the 2D pattern of detailing agent.

* * * * *